(12) United States Patent
Maeda et al.

(10) Patent No.: US 6,751,175 B1
(45) Date of Patent: Jun. 15, 2004

(54) ABERRATION CORRECTING DEVICE AND OPTICAL PICKUP APPARATUS USING THE SAME

(75) Inventors: Takanori Maeda, Tsurugashima (JP); Ikuya Kikuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/458,074

(22) Filed: Dec. 10, 1999

(30) Foreign Application Priority Data

Dec. 11, 1998 (JP) .......................................... 10-353349

(51) Int. Cl.⁷ ................................................ G11B 7/00
(52) U.S. Cl. ................................ 369/53.19; 369/44.32; 369/112.01; 369/44.23
(58) Field of Search .......................... 369/44.23, 44.32, 369/112.23, 112.24, 112.25, 112.28, 53.19, 112.01, 112.02

(56) References Cited

U.S. PATENT DOCUMENTS

| | | | | |
|---|---|---|---|---|
| 3,924,063 A | * | 12/1975 | Simons | .................... 369/12.26 |
| 5,202,875 A | * | 4/1993 | Rosen et al. | ................... 369/94 |
| 5,416,757 A | * | 5/1995 | Luecke et al. | ........... 369/44.23 |
| 5,726,436 A | * | 3/1998 | Oka et al. | ................. 369/44.23 |
| 5,914,923 A | * | 6/1999 | Araki et al. | .............. 369/44.32 |

* cited by examiner

*Primary Examiner*—Thang V. Tran
(74) *Attorney, Agent, or Firm*—Sughrue Mion, PLLC

(57) ABSTRACT

An aberration correcting device is placed in an optical path extending from a light source of an optical pickup apparatus for irradiating a light beam onto an optical disk to the optical disk. The device includes a pair of light-transmission substrates at least one of which is held freely movable in a way that a major surface thereof moves in a direction vertical to the optical path, and which have complementary curved surfaces facing, and apart from, each other. The curved surfaces are formed in such a manner as to cause the optical path length of a light beam transmitting the pair of light-transmission substrates to be changed by movement of the light-transmission substrates, thus imparting a phase difference to a transmitting light beam, while allowing the phase difference to keep an advancing direction of the light beam thereby to minimize a comatic aberration caused by the optical disk.

12 Claims, 11 Drawing Sheets

ABERRATION CORRECTING DEVICE AND OPTICAL PICKUP APPARATUS USING THE SAME

BACKGROUND OF THE INVENTION

1. Field of the Invention

The present invention relates to an optical pickup apparatus in an optical information recording/reproducing apparatus which reads and write signals from and onto an optical disk as an optical information recording medium.

2. Description of the Related Art

The numerical aperture of the objective lens in an optical pickup apparatus may be increased in order to improve the recording density of an optical disk. For example, the numerical aperture is increased to 0.6 from 0.45. According to the standards that have been defined to record information from the information recording surface through a transparent disk substrate having a predetermined thickness, comatic aberration occurs then depending on the inclination of the transparent disk substrate so that the adequate beam spot cannot be irradiated on the information recording surface. As the numerical aperture increases, the amount of the comatic aberration occurred increases prominently. When optical disks are prepared at a low cost using transparent disk substrates which have been produced by injection molding or the like, particularly, the inclination of the transparent disk substrate caused by the warping of the optical disk gets greater. This makes the adverse influence of the comatic aberration greater.

To reduce the influence of the comatic aberration, the transparent disk substrate is made thinner. For instance, the substrate thickness is reduced to 0.6 mm from 1.2 mm. This causes stain, scratches or the like on the surface of the optical disk to noticeably affect information recording/reproduction, thus deteriorating the performance of the optical disk over a long period of usage.

Another solution is to install a tilt (skew) adjusting mechanism for an optical disk into a pickup apparatus and use a tilt servo mechanism which tilts the pickup itself in responsive to the tilt of the optical disk. This scheme suffers a slow response speed due to the large inertial weight of the movable portion. The tilt of the pickup itself cannot therefore follow up a variation in the tilt of the optical disk during one rotation, particularly, the tilt in the direction of the time axis (tangential direction). Accordingly, correcting the comatic aberration caused by the tilt in the tangential direction raises a problem in a pickup apparatus which uses an objective lens having an increased numerical aperture.

One known scheme of correcting the comatic aberration is disclosed in Japanese Unexamined Patent Publication No. Hei 7-140381. As shown in FIG. 1, the comatic aberration is corrected by mutually moving two compensators, which are the combination of a convex surface whose curvature changes by an inclination of R to the fourth power where R is the radius of a pupil, in a direction orthogonal to the optical axis and a concave surface which matches with the convex surface.

If an optical disk 5 is tilted in the tangential direction, aberration in the tangential direction is produced. When a convex lens having a relatively large numerical aperture, such as an objective lens 4, is used, the aberration of the third order or the so-called comatic aberration is large in addition to the astigmatism and high-order aberration. The greater the numerical aperture is, the more noticeable the high-order aberration becomes.

The curve (A) in FIG. 2 shows a change in the aberration-originated optical path difference within a pupil when the transparent disk substrate of the optical disk 5 tilts. The abscissa axis in the figure represents the radial position on the pupil and the ordinate axis represents the produced phase difference of the wavefront as the optical path difference with one wavelength as a unit. In the idealistic aberration-free state, the optical path difference does not occur because the light beam comes perpendicularly in the state so that the peripheral edge is symmetrical to the optical axis centered in the optical path. FIG. 2 shows the results of computing the optical path difference when the optical disk is tilted by an angle of 1 degree from the horizontal state with the numerical aperture of the objective lens being 0.85. This amount of change varies in accordance with the tilt amount of the optical disk.

This aberration is produced by the tilt of the transparent disk substrate of an optical disk, and the upper-leftward increase of the curve of the optical path difference shown in FIG. 2 indicates the deflection of light in the advancing direction from the wavefront or the optical axis which is caused by the tilted transparent disk substrate.

Correcting the wavefront aberration by inserting the compensators having the reverse wavefront aberration having the inverse shape to that of the wavefront aberration (curve (A) in FIG. 2) into the optical path that extends from, for example, the light source to the objective lens imparts deflection in the advancing direction of light in addition to the formation of the wavefront for forming a diffraction limited spot on the optical disk. As shown in FIG. 1, the deflection produces an adverse effect of causing the light beam to obliquely enter the objective lens, thus lowering the image forming performance. Further, when the compensators are used to correct the tangential tilt, the deflection causes the irradiation position to be shifted because an ordinary optical pickup apparatus has no means for adjusting the shift of the irradiation position in the tangential direction, and the positional shift results in jittering in the tangential direction. As the amount of aberration correction necessary at the peripheral portion is large, the positional-shift originated correction error that becomes severe in proportion to the amount of correction becomes larger. This makes it difficult to correct the comatic aberration by an increased numerical aperture.

That is, according to the conventional method, the optical axis is deflected by the movement of the inserted compensators, thus shifting the center position of the spot to be irradiated on an optical disk. This deflection of the irradiation optical axis acts as time-dependent noise (jitter) particularly in correcting the tilt in the tangential direction, so that the tangential tilt cannot be corrected adequately.

OBJECT AND SUMMARY OF THE INVENTION

Accordingly, it is an object of the present invention to provide an optical pickup apparatus capable of preventing the deflection of the irradiation optical axis which is caused by movement of compensators in the conventional correction of the comatic aberration, thereby well removing the time-dependent noise component.

An aberration correcting device according to a first aspect of the present invention being placed in an optical path extending from a light source of an optical pickup apparatus for irradiating a light beam onto an optical disk having a light-permeable layer to the optical disk, comprises:

a pair of light-transmission substrates having complementary curved surfaces facing, and apart from, each other, at least one of the light-transmission substrates being held freely movable in such a way that a major surface thereof moves in a direction vertical to the optical path, the complementary curved surfaces being formed so as to make a relative movement of the light-transmission substrates vary an optical path length of a light beam transmitting the light-transmission substrates to impart a phase difference to the transmitting light beam, while allowing the phase difference to keep an advancing direction of the light beam thereby to minimize a comatic aberration imparted to the transmitting light beam by the light-permeable layer of the optical disk.

In an embodiment of the aberration correcting device of the invention, the complementary curved surfaces are symmetrical to each other at least in a radial direction or tangential direction of the optical disk.

In an embodiment of the aberration correcting device of the invention, the complementary curved surfaces have shapes satisfying a following equation respectively:

$$z=(ax)^4-(bx)^2$$

where "z" is a height in a direction parallel to the optical path and x is a radius about the optical path and $2a^2=b$.

In an embodiment of the aberration correcting device of the invention, one of the light-transmission substrates has a convex surface around the optical path and a normal line of the curved surface at an outermost portion within an effective radius is parallel to the optical path, and the other light-transmission substrate has a concave surface around the optical path and a normal line of the curved surface at the outermost portion within the effective radius is parallel to the optical path.

In an embodiment of the aberration correcting device of the invention, one of the light-transmission substrates has a convex surface around the optical path and a recess formed at an outer portion within an effective radius and a normal line of the curved surface at a bottom of the recess is parallel to the optical path, and the other light-transmission substrate has a concave surface around the optical path and a protrusion formed at an outer portion within the effective radius and a normal line of the curved surface at a top of the protrusion is parallel to the optical path.

In an embodiment of the aberration correcting device of the invention, one of the light-transmission substrates has a convex surface with a center being a symmetrical surface which is a plane including the optical path and a normal line of the curved surface at an outermost portion within an effective radius is parallel to the optical path, and the other light-transmission substrate has a concave surface with a center being the symmetrical surface and a normal line of the curved surface at the outermost portion within the effective radius is parallel to the optical path.

In an embodiment of the aberration correcting device of the invention, one of the light-transmission substrates has a convex surface with a center being a symmetrical surface which is a plane including the optical path and a recess formed at an outer portion within an effective radius and a normal line at a bottom of the recess is parallel to the optical path, and the other light-transmission substrate has a concave surface with a center being the symmetrical surface and a protrusion formed at an outer portion within the effective radius and a normal line at a base of the protrusion is parallel to the optical path.

In an embodiment of the aberration correcting device of the invention, at least one of the light-transmission substrates is driven within a cylindrical surface with one point on the optical path being a center.

In an embodiment of the aberration correcting device of the invention, at least one of the light-transmission substrates is driven within a spherical surface with one point on the optical path being a center.

An optical pickup apparatus, according to the invention, for reading signals from and/or writing signals onto an optical disk for reading signals from and/or writing signals onto an optical disk having a light-permeable layer, comprises:

a light source for emitting a light beam;

an objective lens for focusing the light beam onto an information recording surface of the optical disk;

an optical irradiation system for guiding the light beam to the objective lens along an optical path;

an optical detection system, including photodetection means, for guiding reflected light from the information recording surface to the photodetection means;

tilt detection means for detecting a tilt of the optical disk at least in a radial direction or tangential direction thereof;

aberration correcting means located in the optical irradiation system and comprising a pair of light-transmission substrates having complementary curved surfaces facing, and apart from, each other, at least one of the light-transmission substrates being held freely movable in a direction vertical to the optical path, the complementary curved surfaces being formed such aspherical surfaces as to make a relative movement of the light-transmission substrates vary an optical path length of a light beam transmitting the light-transmission substrates to impart a phase difference to the transmitting light beam, while allowing the phase difference to keep an advancing direction of the light beam; and aberration correction driving means for moving the at least one of the light-transmission substrates in a direction vertical to the optical path in accordance with an output of the tilt detection means corresponding to a tilt amount of the optical disk thereby to minimize a comatic aberration at least in a radial direction or tangential direction which is imparted to the transmitting light beam by the light-permeable layer of the optical disk.

In an embodiment of the optical pickup apparatus of the invention, at least one of the light-transmission substrates is driven within a cylindrical surface with one point on the optical path being a center.

In an embodiment of the optical pickup apparatus of the invention, at least one of the light-transmission substrates is driven within a spherical surface with one point on the optical path being a center.

According to the aberration correcting device of the present invention for use in an optical pickup apparatus, two light-transmission substrates have complementary internal surfaces respectively. The light-transmission substrate have partially different complementary thicknesses respectively in a direction of the axis of irradiation light i.e., optical path and are arranged approximately in parallel to each other in such a way that their optical axes coincide with the irradiation light axis, and one of the light-transmission substrates is moved approximately vertical to the irradiation light axis so that the length of the optical path of the transmission light or the total thickness of the light-transmission substrates can be changed partially. This imparts a predetermined phase difference distribution to the transmission light beam to ensure fast wavefront correction with a smaller amount of correction. Further, it is possible to correct aberration without causing the shift of a beam spot caused by the deflection of the transmission light, so that a time axis variation-dependent noise component can be adequately removed. According to the optical pickup apparatus of the present invention, as apparent from the above, the partial length of the optical path of the transmission light beam is changed by moving the light-transmission substrates to suppress or eliminate deflection of the optical axis. This prevents the irradiation light axis from being deflected by the movement of compensators, so that the irradiation beam spot will not be shifted.

DETAILED DESCRIPTION OF THE PREFERRED EMBODIMENTS

Preferred embodiments of the present invention will now be described referring to the accompanying drawings.

Figure 3:
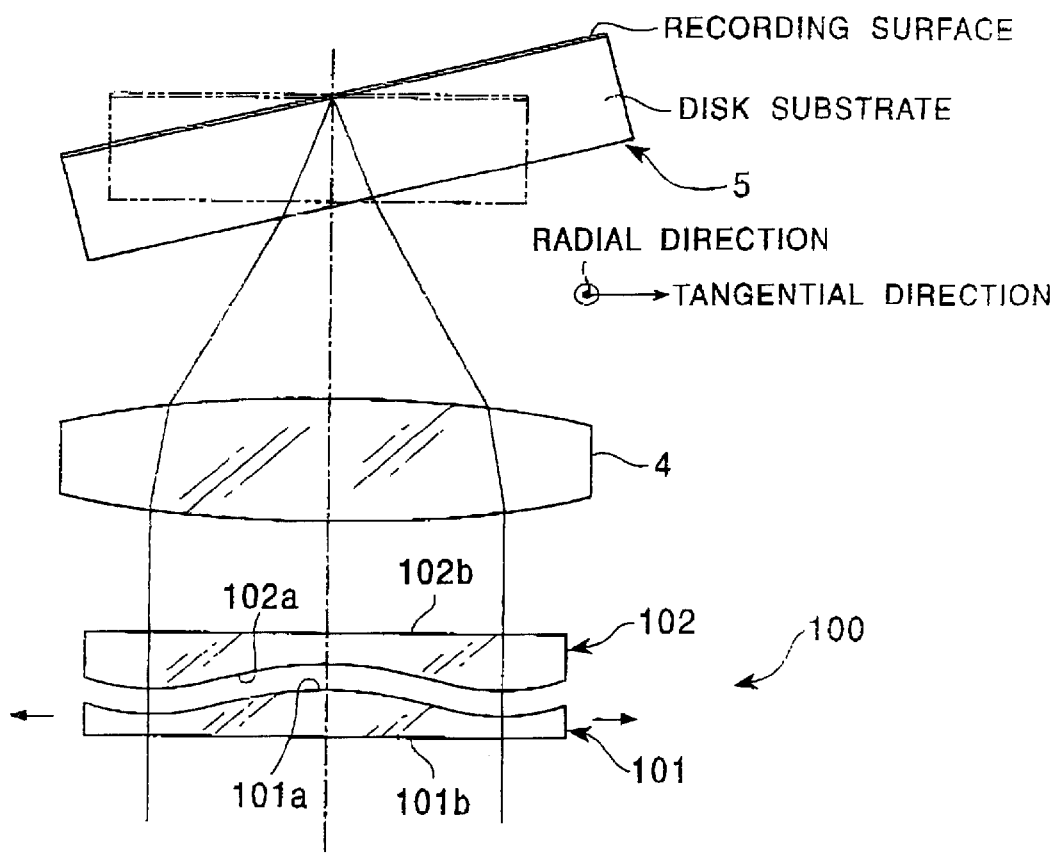
FIG. 3 is a schematic cross-sectional view of an aberration correcting device in an optical pickup apparatus according to one embodiment of the present invention.

An aberration correcting device 100 according to a first embodiment shown in FIG. 3 is placed in an optical path which extends to an optical disk 5 from, for example, a semiconductor laser in an optical pickup apparatus for reading signals from and/or writing signals on the optical disk 5, or an optical path which extends from the optical disk 5 to a photodetector. For instance, the aberration correcting device 100 is located between a collimator lens and an objective lens. The aberration correcting device 100 comprises a first compensator 101 and a second compensator 102 which are glass plates or light-transmission substrates having partially different thicknesses. The first compensator 101 and second compensator 102 are arranged in such a way that their flat surfaces are perpendicular to a pickup optical axis 13. The second compensator 102 is supported in such a manner that its movement in a direction perpendicular to the optical axis, e.g., in the tangential direction or radial direction of the optical disk, is controllable. The movement of the second compensator 102 can allow a comatic aberration in the radial direction alone or a comatic aberration in the tangential direction alone or comatic aberrations in both the radial and tangential directions to be corrected.

As a light beam is deflected or reflected multiple times to be guided to the optical disk, the optical axis of the light beam at a portion where the compensators are located may not be perpendicular to the surface of the optical disk. Therefore, the compensators are not moved only in a direction parallel to the radial direction or tangential direction of the optical disk but are moved in a direction corresponding to the tangential direction or radial direction of the light beam on the surface of the optical disk which is to be irradiated on the disk's surface.

The first compensator 101 and the second compensator 102 respectively have complementary curved surfaces 110a and 102a which are aspherical surfaces facing each other at a distance. The first compensator 101 and the second compensator 102 respectively have parallel flat surfaces 101b and 102b on the opposite sides to the facing curved surfaces 110a and 102a. At least one of the first compensator 101 and the second compensator 102 has only to be held in such a way that the optical axis of its curved surface is freely movable in directions approximately parallel to and vertical to the optical axis of the optical path of the light beam. In a case of correcting a comatic aberration associated with only one of the tangential direction and radial direction, the curved surfaces of the compensators are aspheric surfaces symmetrical to each other with respect to a plane including the optical axis as a symmetrical plane. If the curved surfaces of the compensators are aspherical surfaces symmetrical to each other with respect to the optical axis, comatic aberrations both in the tangential direction and radial direction can be corrected.

Note that with regard to the compensators which correct a comatic aberration in one of the tangential direction and radial direction, a plane including the optical axis and parallel to a direction corresponding to the tangential direction or radial direction of the light beam on the surface of the optical disk which is to be irradiated on the disk's surface is called "symmetrical surface".

As regards the compensators which correct comatic aberrations in both the tangential direction and radial direction, an axis parallel to the optical axis is a symmetrical axis.

The shapes of the curved surfaces 101a and 102a of the first and second compensators 101 and 102 will now be discussed. In the optical system including the objective lens of an optical pickup, signal recording and reproduction are carried out through a transparent disk substrate i.e., light-permeable layer having a predetermined thickness. In a case where the transparent disk substrate is not tilted, i.e., in a case where the transparent disk substrate is arranged perpendicular to the optical axis, the optical system is designed in such a way that a diffraction limited spot is formed on the recording surface of the optical disk.

According to the embodiment, the wavefront aberration that is produced when the substrate is tilted is corrected by using the compensators having curved surfaces to which such a wavefront aberration as has reduced the deflection in the advancing direction of light, not by inserting the conventional compensators which produce the reverse wavefront aberration whose shape is inverse to that of the wavefront aberration (FIG. 2) into the optical path. In general, from the relationship of aberration with the diameter of the entrance pupil of an optical element like a lens, a comatic aberration greatly depends on the diameter of the entrance pupil. That is, as the numerical aperture of the entrance pupil increases, the comatic aberration becomes larger. Therefore, it is possible to suppress the deflection of the optical axis by decreasing the optical path difference toward the outer periphery from near the axis of the optical element in addition to canceling the comatic aberration of the disk substrate by applying the inverse comatic aberration by means of the aberration correcting device.

The curved surfaces 101a and 102a are therefore formed in such a manner as to cause the optical path length of a light beam, which passes the transparent substrates of the optical disk, to be changed by the movement of at least one of the first and second compensators, thus imparting a phase difference to the transmitted light beam while allowing the phase difference to keep the advancing direction of the light beam, in order to minimize the comatic aberration at least in the tangential direction which is to be imparted to the transmitted light beam.

Figure 1:
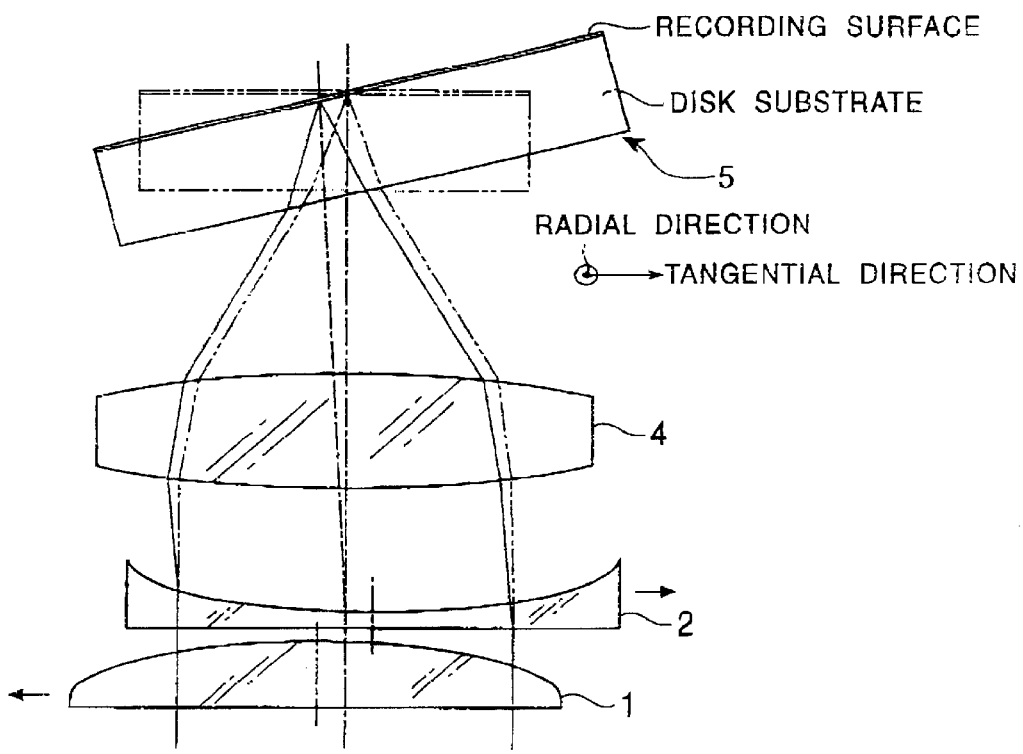
FIG. 1 is a schematic cross-sectional view of an apparatus for executing comatic aberration correction.
Figure 2:
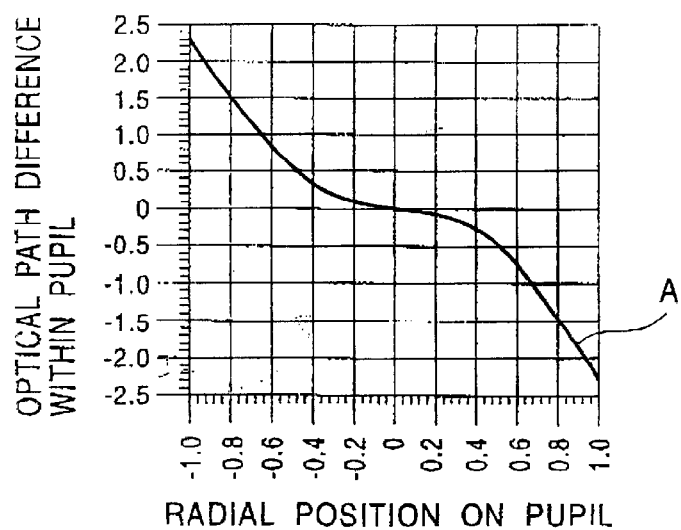
FIG. 2 is a graph showing an aberration-originated change in optical path difference when the substrate of an optical disk tilts.
Figure 4:
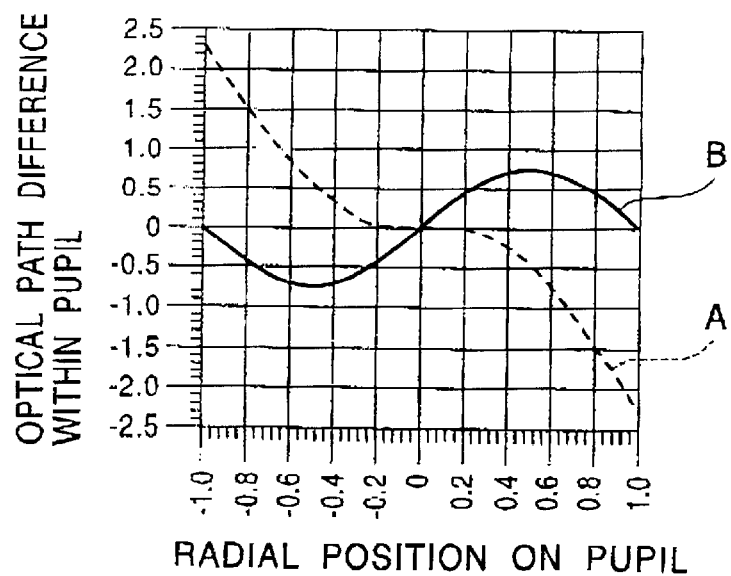
FIG. 4 is a graph showing a change in the optical path difference of the aberration correcting device in the optical pickup apparatus according to the embodiment.

According to the present invention, therefore, the shape of the phase difference of the wavefront to be corrected is the curve (B) in FIG. 4 which is the shifted amount removed from the wavefront having the aberration curve (A) in FIG. 4 corresponding to FIG. 2.

Figure 5:
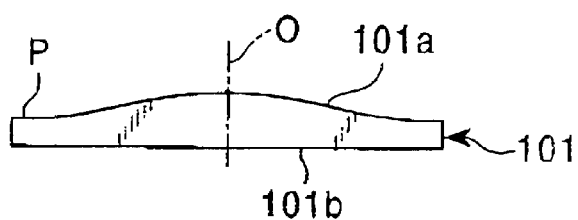
FIG. 5 is a schematic cross-sectional view of the aberration correcting device in the optical pickup apparatus according to the embodiment.
Figure 6:
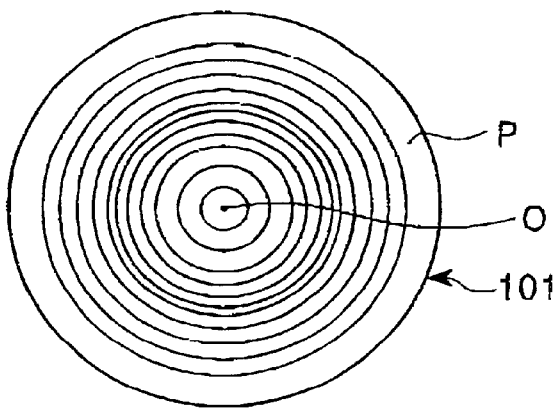
FIG. 6 is a schematic plan view of the aberration correcting device in the optical pickup apparatus according to the embodiment.
Figure 7:
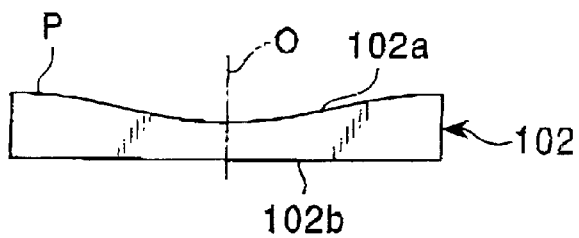
FIG. 7 is a schematic cross-sectional view of the aberration correcting device in the optical pickup apparatus according to the embodiment.

FIGS. 5, 6 and 7 show the surface shapes of the curved surfaces 111a and 102a of the first and second compensators used in the first embodiment shown in FIG. 3.

FIG. 5 is a cross-sectional view showing the thickness of the first compensator 101 in the radial direction in the orthogonal coordinate system. FIG. 6 is its contour line chart. As shown in FIGS. 5 and 6, the curved surface of the first compensator 101 becomes thinner toward the outermost peripheral portion P from the optical axis O in a symmetrical fashion. What is more, that curved surface has such a shape that the rate of change of the thickness is 0 not only at the center portion O but also at the outermost peripheral portion "P". That is, the first compensator 101 is formed in such a manner that the direction of the normal line of its internal surface is parallel to the optical axis at the top of the center portion "O" and in the ring-like area at the outermost peripheral portion "P".

FIG. 7 also shows the thickness of the second compensator 102 in the radial direction in the orthogonal coordinate system. As shown in FIG. 7, the curved surface of the second compensator 102 becomes thicker toward the outer portion from the optical axis O in a symmetrical fashion, and what is more, that curved surface has such a shape that the rate of change of the thickness is zero at the outermost peripheral portion "P". That is, the second compensator 102 is formed in such a way that the direction of the normal line of its internal surface is parallel to the optical axis at the recessed portion at the center portion "O" and in the ring-like protruding area at the outermost peripheral portion "P". Because the curved surface of the second compensator 102 is so formed as to be complementary to the curved surface of the first compensator 101 shown in FIGS. 5 and 6, those two compensators become a plane parallel plate by putting the curved surfaces together. Each curved surface is symmetrical with respect to at least the radial direction or tangential direction of the optical disk.

The aberration correcting device is constructed by arranging those first and second compensators 101 and 102, one over the other and apart from each other so that they do not contact each other, with their optical axes being the same and coincident with the axis of the irradiation light, and by making at least one of the compensators, e.g., the first compensator 101, movable in a direction perpendicular to the optical axis by a predetermined distance.

The following will discuss a design example of the shapes of the curved surfaces 101a and 102a of the first and second compensators in the first embodiment. First, let us consider a case where a phase difference i.e., curve (A) shown in FIG. 4 is produced in proportion to the third-order function of the distance from the typical optical axis of aberration caused by the tilting of the optical disk. $OPD_0$ which represents the optical path difference i.e., curve (B) shown in FIG. 4 that is the amount of change subtracted from the phase difference can be given by:

$$OPD_0(x, y) = \alpha x^3 - \alpha x$$

where x is the distance from the optical axis.

Suppose that the convex shape of the curved surface 101a of the first compensator 101 which is on the side facing the second compensator 102 and is to be acquired is given by the following equation (1).

$$z_1 = (ax)^4 - (bx)^2 \qquad (1)$$

The values of the constants "a" and "b" will be specified later.

The convex shape of the second compensator 102 which is on the side facing the first compensator 101 is complementary to the convex shape of the first compensator 101 and is given by:

$$z_2 = (ax)^4 - (bx)^2.$$

If the interval between the first compensator 101 and the second compensator 102 is sufficiently small and "a" is a small value, the optical path difference OPD of the parallel lights that have passed those two compensators becomes $$OPD(x, y) = z_2(x) - z_1(x) = 0$$

so that there is no change caused in the distribution of the wavefront phase difference by the transmission of the parallel lights through the two compensators.

Let us now consider a phase difference when the second compensator 102 is moved in an x direction by $\Delta x$. The optical path difference then is given by $$OPD(x; y+\Delta x, y) = z_1(x) - z_2(x+\Delta x) = 4a^4\Delta xx^3 - 2b^2\Delta xx + 6a^4\Delta x^2x^2 - b^2\Delta x^2 + 4a^4\Delta x^3x + a^4\Delta x^4.$$

Neglecting the terms of the second or higher power of $\Delta x$, it yields as follows:

$$OPD = 4a^4\Delta xx^3 - 2b^2\Delta xx.$$

Figure 8:
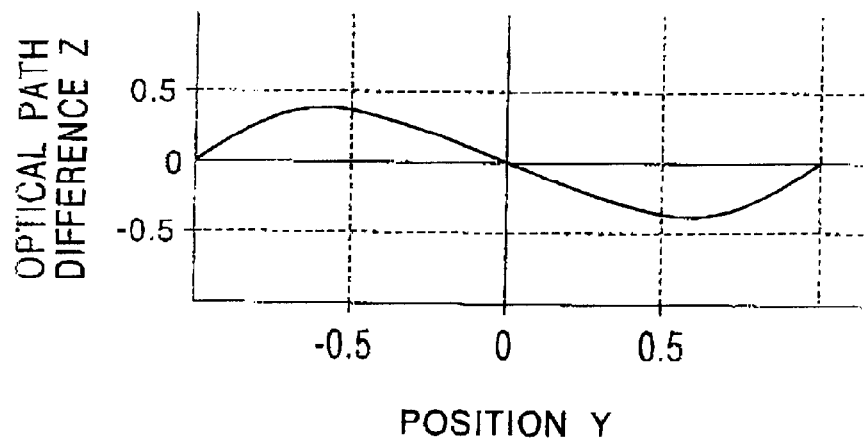
FIG. 8 is a graph showing the inverse change in the optical path difference of the aberration correcting device in the optical pickup apparatus of the embodiment.

By expressing "x" as a unit of the radius of the pupil and setting $2a^2 = b$, the wavefront having a change of curve (B) shown in FIG. 4 can be corrected. As the outline of the above-described designing, the optical path difference shown in FIG. 8 which is inverse to the optical path difference of curve (B) shown in FIG. 4 is added to the latter optical path difference with respect to the surface of the entrance pupil to cancel out the phase difference.

A description will now be given of an optical pickup apparatus which uses the aberration correcting device of the first embodiment and reads and writes signals from and onto an optical disk.

Figure 9:
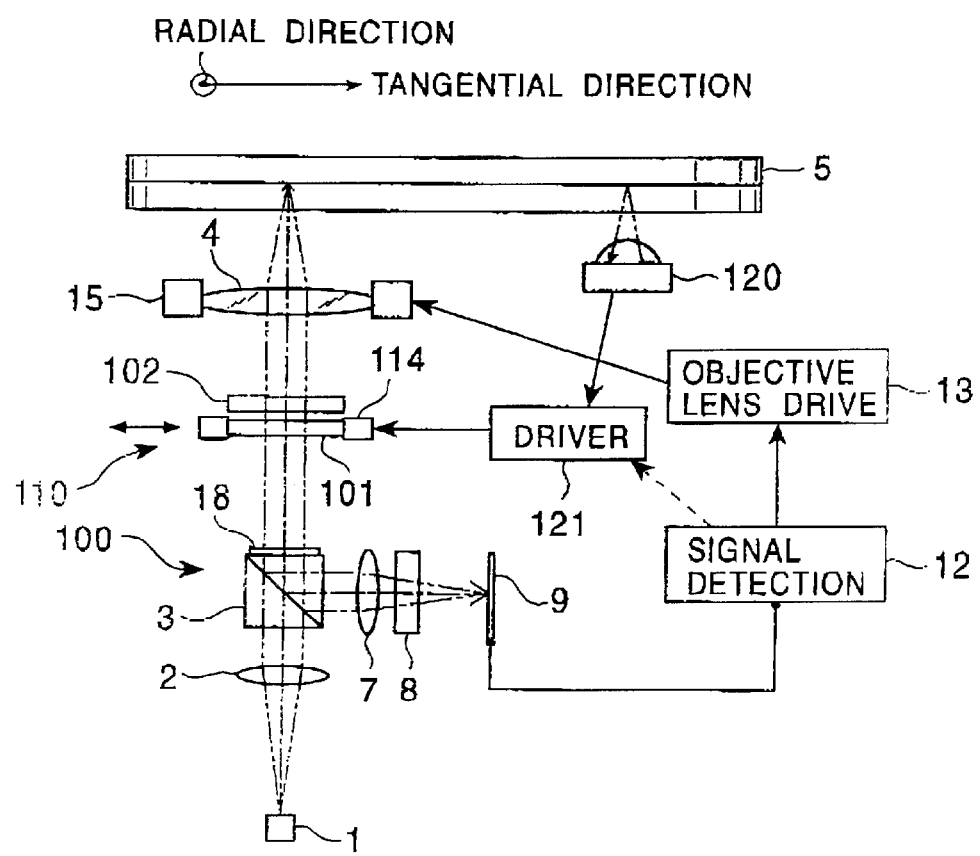
FIG. 9 is a schematic structural diagram showing the optical pickup apparatus of the present invention.

FIG. 9 shows an optical pickup apparatus which uses an astigmatism scheme. A recording/reproducing apparatus, which records and reproduces information on and from an optical disk 5 like an optical video disk or digital audio optical disk loaded therein, is equipped with the so-called focus servo and tracking servo which allow the light beam for information writing/reading to always converge onto a series of pits formed spirally or concentrically on the information recording surface of the optical disk.

The optical pickup apparatus mainly comprises an objective lens unit and a main unit which supports the objective lens unit. The main unit is secured to a slider mechanism which moves on a shaft extending in the radial direction of the optical disk 5.

As shown in FIG. 9, the objective lens unit has an objective lens 4, an elastic support member like a flat spring, which supports the objective lens 4 on the objective lens unit 40, and an objective-lens driving mechanism 13 like an actuator which drives the objective lens 4 in the radial direction and focusing direction of the optical disk 5 in order to focus the light beam onto the information recording surface of the optical disk 5. The objective-lens driving mechanism has a coil extending in the radial direction and focusing direction and a magnetic circuit. The coil and magnetic circuit operate in cooperation with an objective-lens holder.

As shown in FIG. 9, the main unit has an optical irradiation system which includes a semiconductor laser 1, a collimator lens 2, a polarized-beam splitter 3 and a ¼-wavelength plate 18 and guides the light beam from the semiconductor laser 1 to the objective lens 4. The main unit further comprises an optical detection system which includes the polarized-beam splitter 3, a condenser lens 7 for detection and an astigmatism generating element 8, such as a cylindrical lens or multi-lens, and which guides the reflected light from the optical disk 5 to photodetection means or a quarter-split photosensor 9 which has four light-receiving surfaces separated by two perpendicular lines.

The first and second compensators 101 and 102, which have complementary curved surfaces facing each other at some clearance therebetween, are arranged between the polarized-beam splitter 3 in the optical irradiation system and the objective lens 4 in such a way that their optical axes coincide with the optical axis of the optical system. The first compensator 101 is held by aberration correction driving means 110 in such a way as to be freely movable in a direction perpendicular to the optical axis.

The aberration correction driving means 110 includes an actuator 114, a tilt-detection photosensor 120 and an actuator driver 121. The tilt-detection photosensor 120 generates an output signal corresponding to the amount of tilting of the optical disk 5 and supplies the signal to the actuator driver 121. The actuator driver 121 moves the first compensator 101 in the direction perpendicular to the optical axis according to a tilt error signal, thereby minimizing a comatic aberration at least in the tangential direction or the radial direction, which is imparted to the transmitted light beam by the transparent substrate of the optical disk.

The tilt-detection photosensor 120 detects a tilt at least in the tangential direction (or the radial direction) of the optical disk 5. The tilt detection means may also be accomplished by using a three-beam method by which a diffraction grating is inserted in the optical irradiation system, providing detection areas on both sides of the quarter-split photosensor 9 and detecting the tilt from the outputs of those detection areas by a signal detector 12, whereby the signal detector 12 can directly drive the actuator 114.

Figure 10:
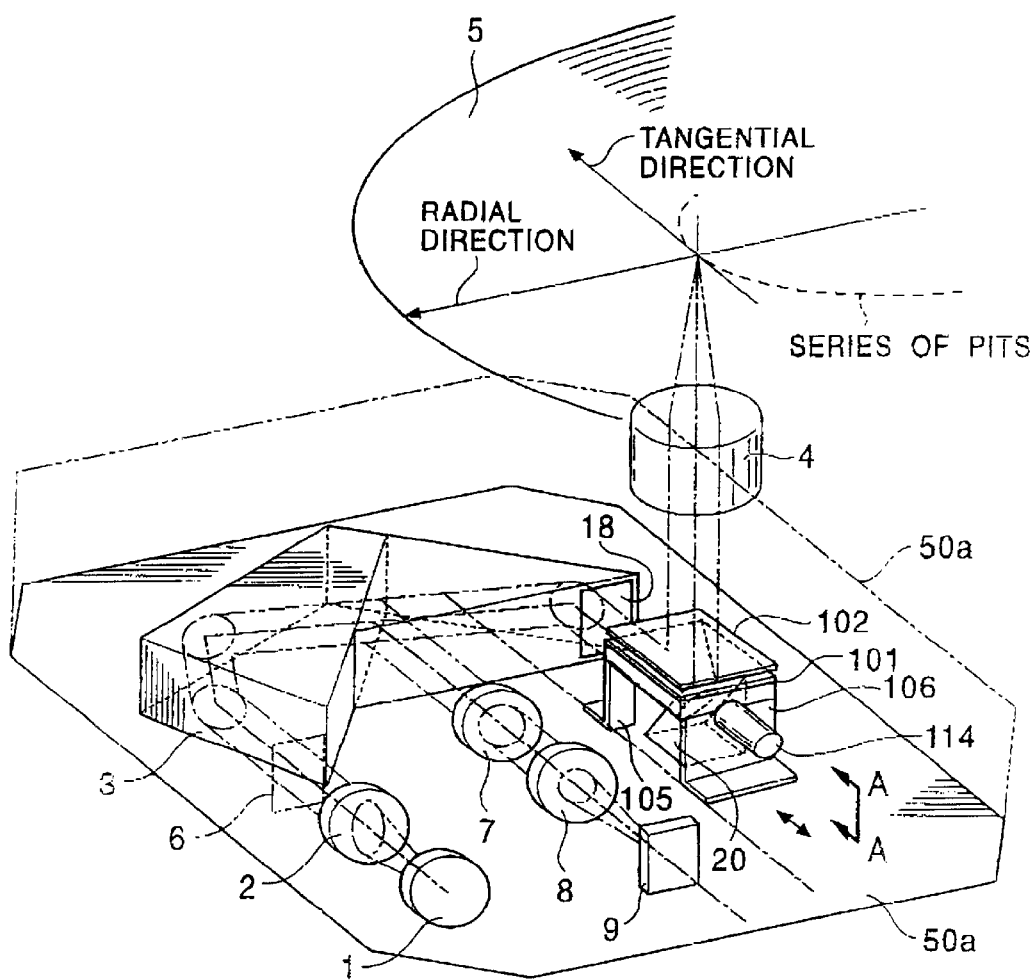
FIG. 10 is a schematic partial perspective view showing the relationship between the optical irradiation system and optical detection system of the optical pickup apparatus according to the embodiment.
Figure 11:
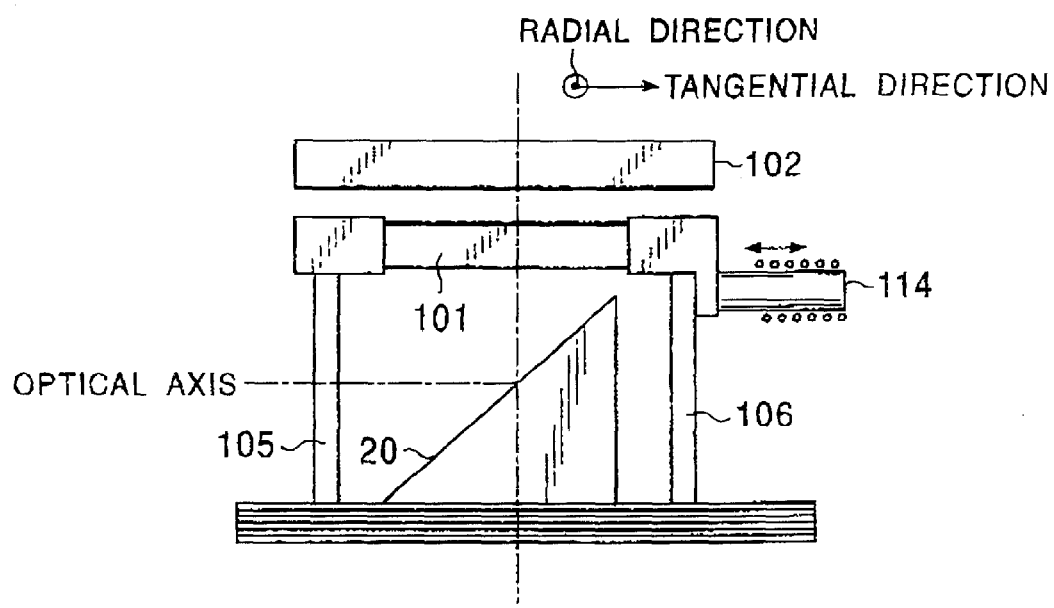
FIG. 11 is a schematic cross-sectional view depicting a driving mechanism in the aberration correcting device in the optical pickup apparatus according to the embodiment.

FIGS. 10 and 11 shows an example of the aberration correction means 110 in the optical pickup apparatus according to the first embodiment.

As shown in FIG. 10, a rising reflector 20 is provided on a base portion 50a of the optical irradiation system of the main unit 50. The rising reflector 20 raises the optical axis of the light beam, which is emitted from the semiconductor laser 1 and passes the collimator lens 2, the polarized-beam splitter 3 and the ¼-wavelength plate 18 in order, to the objective lens 4. The optical path is deflected at right angles by a mirror surface which crosses the optical axis of the rising reflector 20 at an angle of 45 degrees.

The second compensator 102 is fixed to the base portion 50a by a support (not shown). The first compensator 101 separated in parallel from the second compensator 102 is supported by two parallel springs 105 and 106 in such a manner that the optical axis of the first compensator 101 is perpendicular to the optical axis of the light which is deflected and enters the objective lens 4, i.e., in such a manner that the optical axes of both compensators coincide with the irradiation light axis. The first compensator 101 is therefore freely movable while keeping its parallel state to the second compensator 102. The actuator 114 actuates the first compensator 101 in the tangential direction in accordance with the output of the actuator driver 121 which corresponds to the tilt amount of the optical disk 5.

As the aberration correcting device is provided between the polarized-beam splitter 3 to which the ¼-wavelength plate 18 of the optical detection system is attached and the objective lens 4, it is possible to adequately correct the comatic aberration in the irradiation light beam and the returning reflected light. It is to be noted that the polarized-beam splitter 3 used here is a composite prism which has such a partial function of the optical detection system as to lead the reflected light from the optical disk 5 to the quarter-split photosensor 9 as well leads the parallel light beams, obtained at the light beam from the semiconductor laser 1 passes the collimator lens 2, while shaping the parallel light beams.

The operation of the optical pickup apparatus using the aberration correcting driving apparatus of the first embodiment will now be discussed. As shown in FIG. 10, the linearly-polarized light beam emitted from the semiconductor laser 1 is transformed into parallel beams by the collimator lens 2, is shaped by the polarized-beam splitter 3, is transformed into circularly-polarized light by the ¼-wavelength plate 18 and is deflected by the rising reflector 20 toward the objective lens 4 along the optical axis of the optical irradiation system approximately perpendicular to the optical disk 5. As shown in FIG. 11, the light beam is given a predetermined optical path length distribution as it passes the first and second compensators 101 and 102 of the aberration correcting device, and is then converged by the objective lens 4, thus forming a beam spot on the recording surface of the optical disk 5. The comatic aberration is canceled out by the transparent substrate of the optical disk 5, and the reflected light of the beam spot passes through the objective lens 4, the first and second compensators 101 and 102 of the aberration correcting device and the rising reflector 20 and is linearly polarized by the ¼-wavelength plate 18. The linearly-polarized light is reflected at the dielectric multilayer film of the polarized-beam splitter 3 to be led to the detection condenser lens 7 and then enters the quarter-split photosensor 9 after passing the astigmatism generating element 8. The astigmatism generating element 8 generates so-called astigmatism so as to irradiate a beam spot of a complete round on the quarter-split photosensor 9 when the light beam converged on the recording surface of the optical disk 5 is in focus and irradiate a beam spot elliptical in the orthogonal direction of the element on the quarter-split photosensor 9 when the light beam is out of focus.

The quarter-split photosensor 9 photoelectrically converts the portions of the beam spot irradiated on the four light-receiving surfaces to the respective electric signals according to their intensities, and sends the signals to the signal detector 12. The signal detector 12 generates a focus error signal and tracking error signal based on the electric signals supplied from the quarter-split photosensor 9 and sends those error signals to the actuator driver 13. The actuator driver 13 supplies the actuator 15 with the drive signals. In accordance with the drive signals, the actuator 15 moves the objective lens 4 in the corresponding direction. As the aberration correcting device always corrects aberration, the comatic aberration is canceled out with the comatic aberration thereby to nearly minimize the aberration of the whole optical system from the light source to the optical disk.

A second embodiment of the present invention will now be described with reference to FIGS. 12 to 18. In those diagrams, those components of the embodiment which are the same as the corresponding components of the first embodiment are respectively denoted by the same reference numerals.

Figure 12:
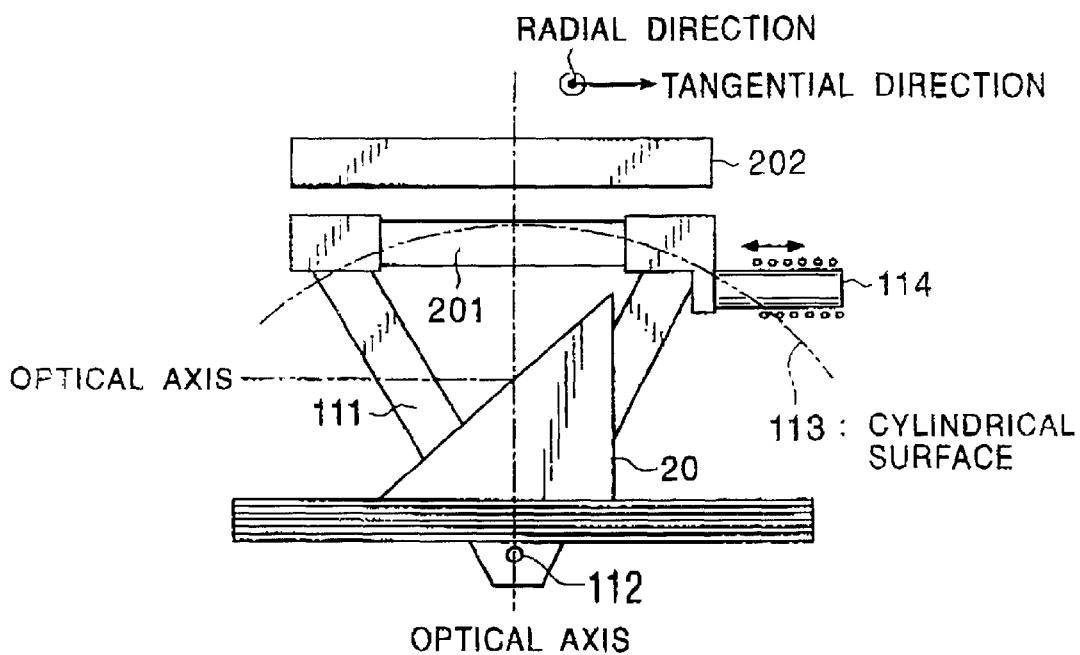
FIG. 12 is a schematic cross-sectional view illustrating a driving mechanism in an aberration correcting device in an optical pickup apparatus according to another embodiment of the present invention.
Figure 13:
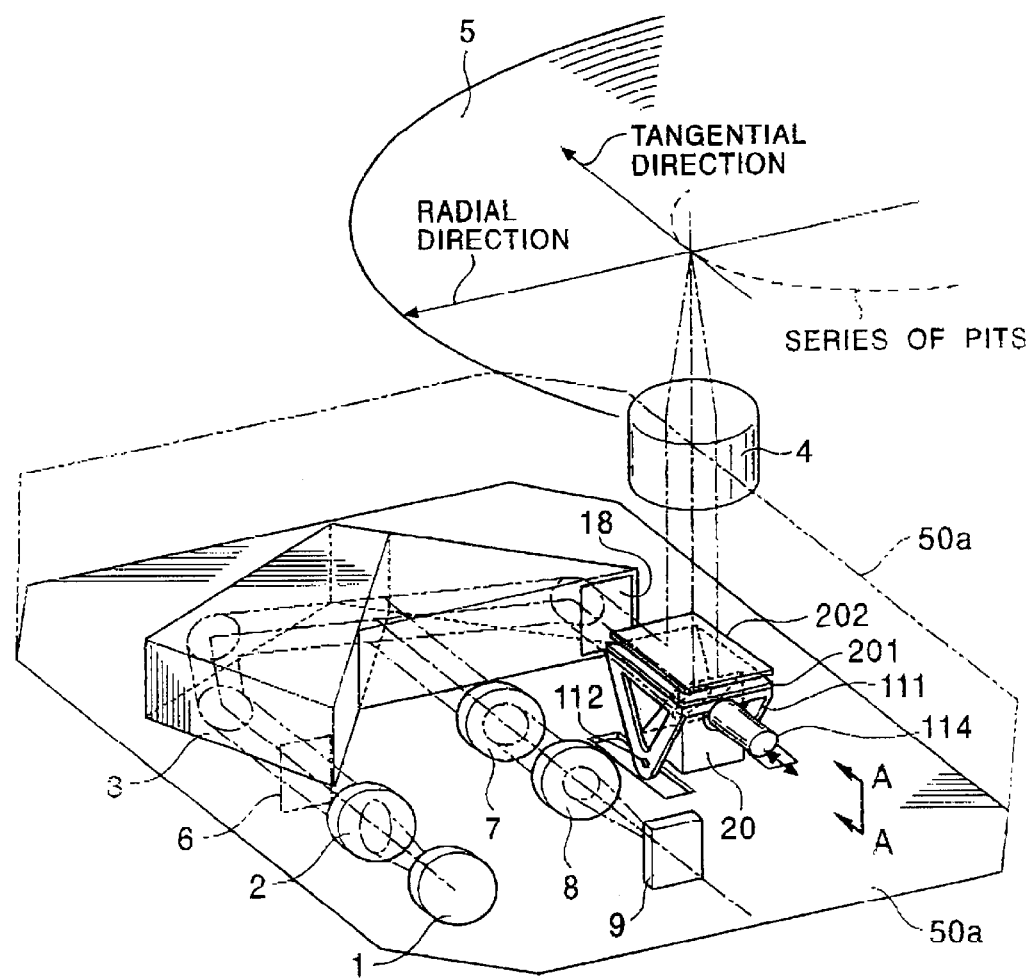
FIG. 13 is a schematic partial perspective view showing the relationship between the optical irradiation system and optical detection system of the optical pickup apparatus according to the second embodiment.

In the second embodiment, a driving apparatus for rocking a first compensator 201 as shown in FIG. 12 is used in place of the driving apparatus which makes parallel movement of the first compensator 101 supported by the two parallel springs 105 and 106 in the first embodiment shown in FIG. 11. While the first compensator 201 and a second compensator 202 respectively correspond to the first and second compensators 101 and 102 in the first embodiment, they are aberration correcting lenses whose curved surfaces have slightly different shapes.

As shown in FIG. 12, even in the optical irradiation system of the main unit 50, the second compensator 202 is secured to the base portion 50a by a holding member (not shown). The first compensator 201 separated in parallel from the second compensator 202 is supported by a support member 111 in such a manner that the optical axis of the first compensator 201 is perpendicular to the optical axis of the light which is deflected and enters the objective lens 4, i.e., in such a manner that the optical axes of both compensators coincide with the irradiation light axis. Because the support member 111 is pivotably supported on the base portion 50a around a rotary shaft 112 extending in the radial direction of the optical disk 5 which crosses the optical axis, the first compensator 201 is freely movable in the tangential direction of the optical disk 5 within a cylindrical surface 113 around the rotary shaft 112 as shown in FIG. 11. The support member 111 is driven together with the first compensator 201 by the actuator 114 in accordance with the output of the actuator driver 121 which corresponds to the tilt amount of the optical disk 5.

Figure 20:
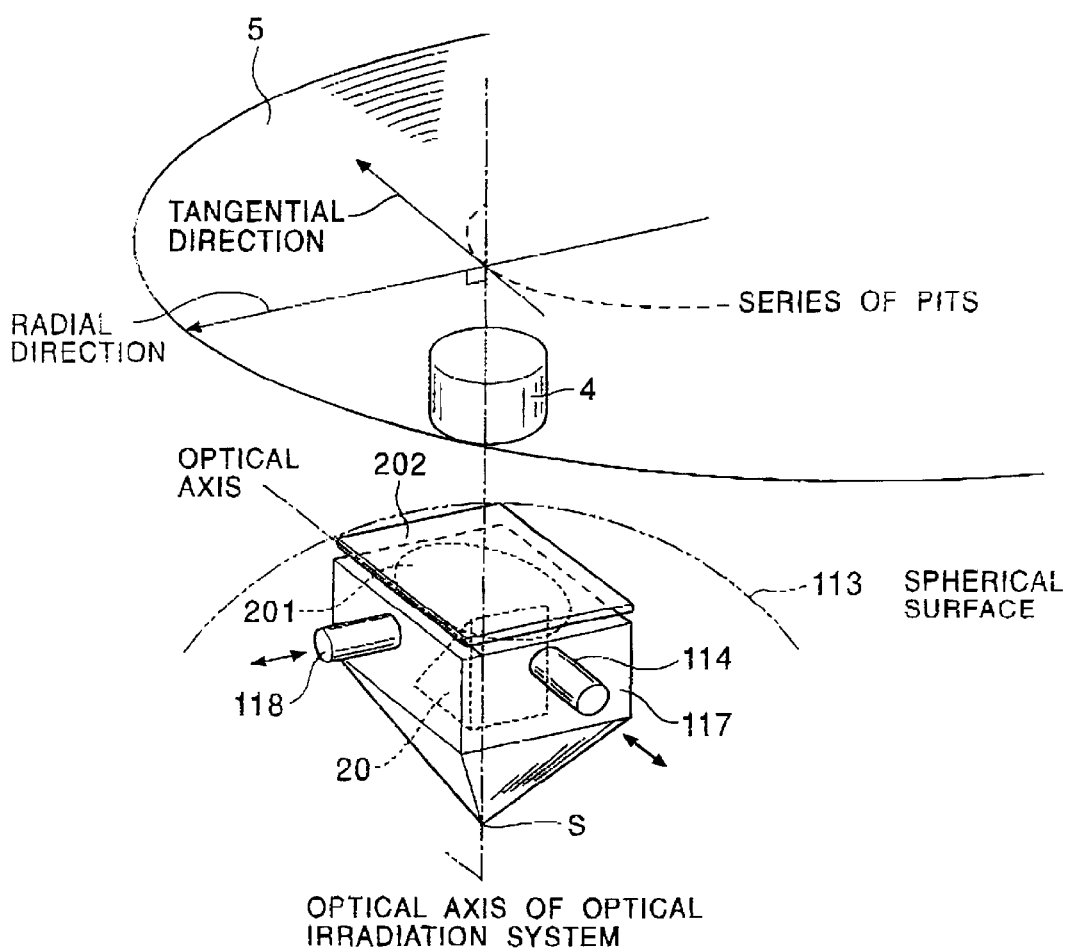
FIG. 20 is a schematic partial perspective view showing an aberration correcting device of another embodiment.

Instead of using the support member 111, the first compensator 201 may be secured on the top surface of a pivot support member 117 rotatably supported around a point S on the optical axis of the optical irradiation system so that the first compensator 201 is driven within a spherical surface 113 around the point S as shown in FIG. 20. In this case, the comatic aberration in the tangential direction and the comatic aberration in the radial direction can simultaneously be corrected fast by providing an actuator which drives the first compensator 201 in the radial direction of the optical disk 5 in addition to the actuator 114 which drives the first compensator 201 in the tangential direction.

Figure 14:
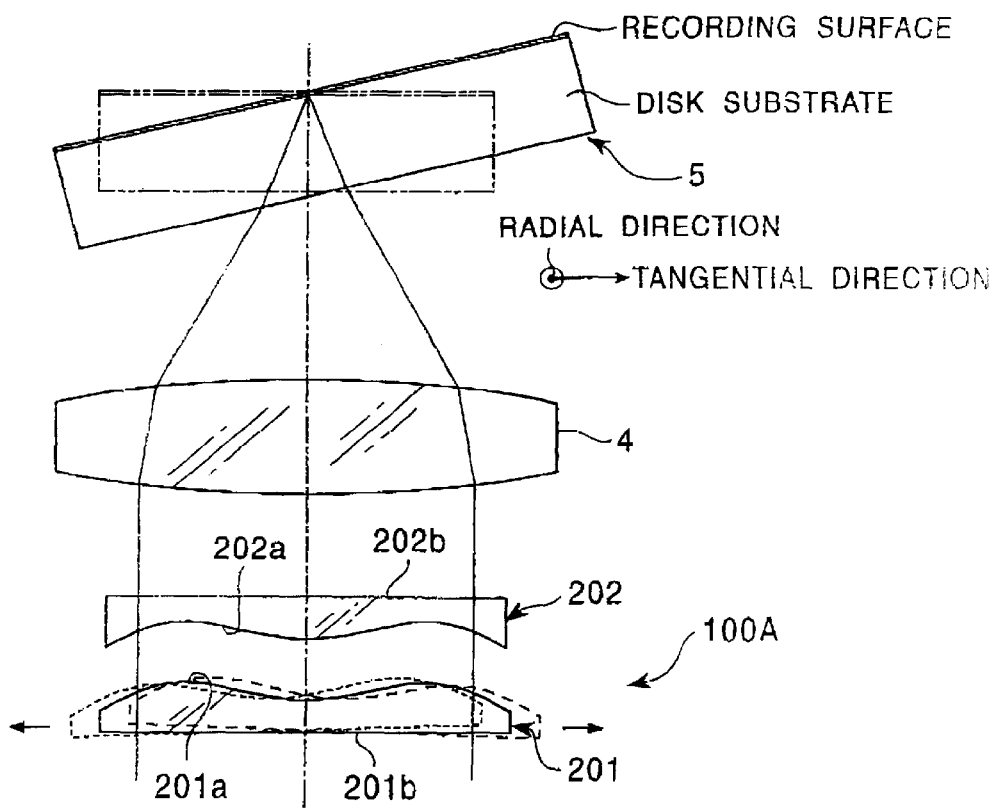
FIG. 14 is a schematic cross-sectional view of the aberration correcting device in the optical pickup apparatus according to the second embodiment.

In an aberration correcting device 100A of the second embodiment shown in FIG. 14, the first compensator 201 and the second compensator 202 also have curved surfaces 201a and 202a which are complementary aspheric surfaces facing each other at a clearance therebetween. The opposite sides of the first and second compensators 201 and 202 to the opposing curved surfaces 201a and 202a are flat surfaces 201b and 202b which are parallel to each other in the initial state. At least one of the first and second compensators 201 and 202 has only to be held in such a way that the optical axis of its curved surface is freely movable approximately in parallel to and perpendicular to the optical axis of the optical path of the light beam.

The shapes of the curved surfaces 201a and 202a of the first and second compensators 201 and 202 will now be discussed. The following description will be given on the assumption that the distance from the rotary shaft 112 to the first compensator 201 is sufficiently larger than the distance the first compensator 201 moves with respect to the second compensator 202.

Figure 15:
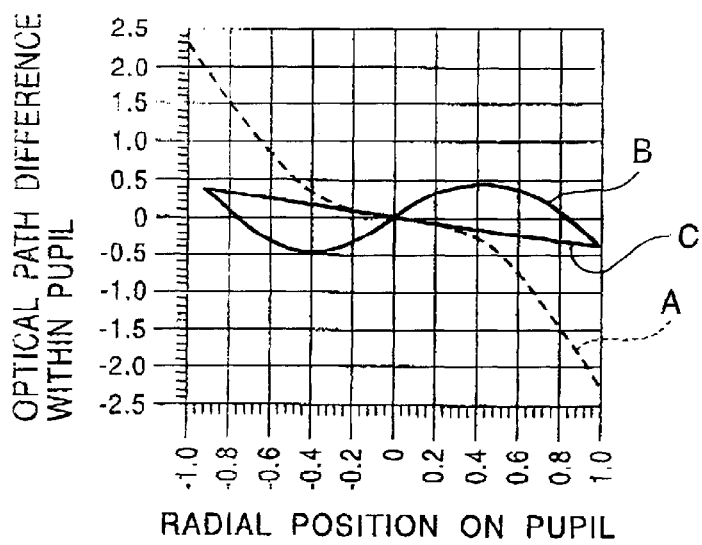
FIG. 15 is a graph showing a change in the optical path difference of the aberration correcting device in the optical pickup apparatus according to the second embodiment.

As shown in FIG. 14, because the surface 201b of the first compensator 201 on the rotary shaft side (112) is flat, the flat surface 201b is inclined to the incident parallel light beams. As indicated by a change (C) in optical path length difference in FIG. 15, the tilting shifts the incident parallel light in the actuating direction. At this time, the aberration curvature (A) caused by the tilt of the transparent disk substrate includes the change (C) as shown in FIG. 15. Therefore, FIG. 15 shows the curvature (B) for the amount of aberration to be corrected. Coefficients "a" and "b" of the shapes of the curved surfaces are determined accordingly. The coefficients "a" and "b" can be so determined by computation that the surface shapes of the first and second compensators 201 and 202 minimize the occurrence of aberration.

Figure 16:
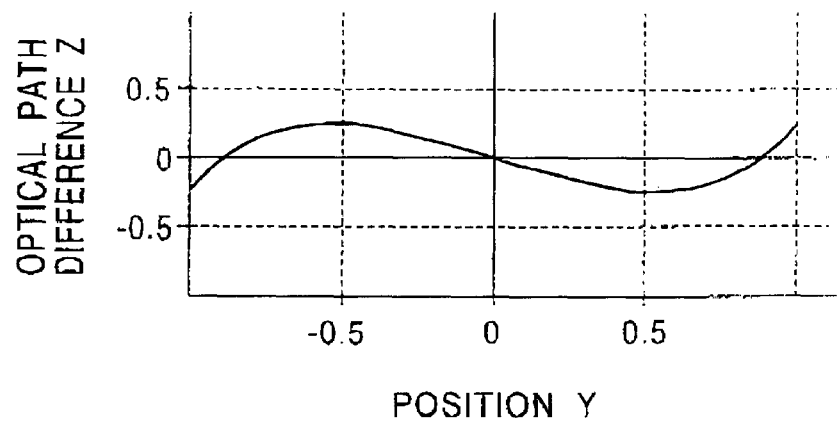
FIG. 16 is a graph showing the inverse change in the optical path difference of the aberration correcting device in the optical pickup apparatus of the second embodiment.

Let us consider a case where the phase difference occurs in proportion to the third-order function of the distance from the optical axis which is the typical type of aberration caused by tilting of the optical disk as per the first embodiment. The phase difference at this time changes along the radial direction as shown in FIG. 16. At this time, as the surfaces 201a and 202a have only to correct what results from further removing the shifted amount caused by the inclination of the opposite surfaces thereof from the phase difference of the first embodiment, the optical path length difference $OPD_0$ can be expressed as follows:

$$OPD_0(x, y) = \alpha x^3 - \alpha x + \beta x$$

where x is the distance from the optical axis and $\beta x$ is the inclination. At this time, the wavefront to be corrected is as shown in FIG. 16.

Figure 17:
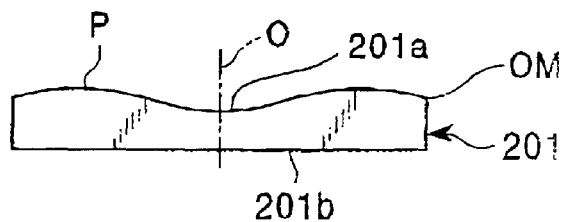
FIG. 17 is a schematic cross-sectional view of the aberration correcting device in the optical pickup apparatus according to the second embodiment.
Figure 18:
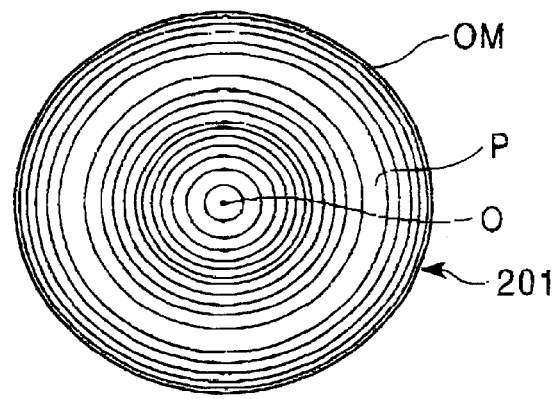
FIG. 18 is a schematic plan view of the aberration correcting device shown in FIG. 17.
Figure 19:
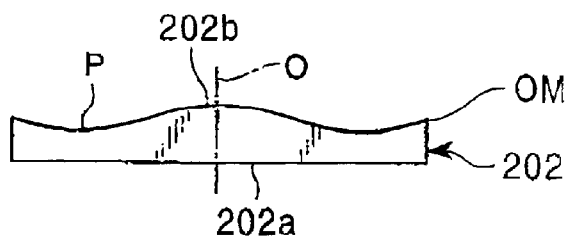
FIG. 19 is a schematic cross-sectional view of the aberration correcting device in the optical pickup apparatus according to the second embodiment.

The surface shape of the first compensator 201 which makes the correction becomes as shown in FIGS. 17 and 18, and the maximum value of the thickness lies at a middle P between the optical axis "O" to the outermost peripheral-portion "OM". That is, the center portion "O" is a recess and a convex ring portion "P" is formed at an outer portion within the effective diameter. The surface shape of the second compensator 202 is inverse to the shape, so that the center portion O is a protrusion and a recessed ring portion P is formed at an outer portion within the effective diameter as shown in FIG. 19.

Since the surface shapes of the aberration compensators can be designed flatter than those of the first embodiment according to the second embodiment, they are easier to form. As the first compensator 201 is actuated while being supported by the rotary shaft 112, it is possible to suppress displacement and surface fluctuation at the time of actuation, thus ensuring an excellent correcting performance.

As described above, because the shapes of the aberration compensators can be determined once the optical system to be compensated and the shift amount to be set are decided, it is possible to produce dies using precision NC machine and ensure low-cost mass-production using pressing of glass or resin molding. Further, a servo system which always suppress the aberration caused by tilting of the optical disk can be constructed by attaching one of the compensators to a minute-motion actuator and driving the actuator based on the detected tilt amount of the optical disk or a signal representing the comatic aberration amount. As the actuator which operates over a range from a low frequency to a high frequency can be used, it is possible to reproduce good signals even from an optical disk which has such a shape as to change the tilt of the optical disk multiple times in one rotation. This servo system can be constructed by employing a scheme of monitoring the quality of signals like amplitude or jittering and carrying out such control as to always provide the best signals.

According to the above-described embodiments, the shapes of the compensators are indicated by using only the component which is proportional to the fourth power of the distance on the pupil. Although the above embodiments can correct the comatic aberration caused by tilting of the optical disk, higher- and even-order components such as the sixth power, eighth power and tenth power of the distance on the pupil may be added to cope with the transparent substrate of the optical disk which does not have a uniform thickness and is deformed. This can permit correction of an aberration component of a higher order like fifth order, seventh order or ninth order.

In this case, $z = (ax)^6 - (bx)^4 + Cx^2 + Dx$ can be used instead of the foregoing equation (1) for the curved surfaces. In this case too, the coefficients in the individual terms can be determined by using the same method as employed in the case of making third-order correction.

Although the above-described embodiments have been described with reference to a case where tilt correction in the tangential direction is performed, it is possible to modify the structure in such a way as to also correct the tilt of the optical disk in the radial direction by turning the aberration compensators and the actuating direction with respect to the optical disk.

Figure 21:
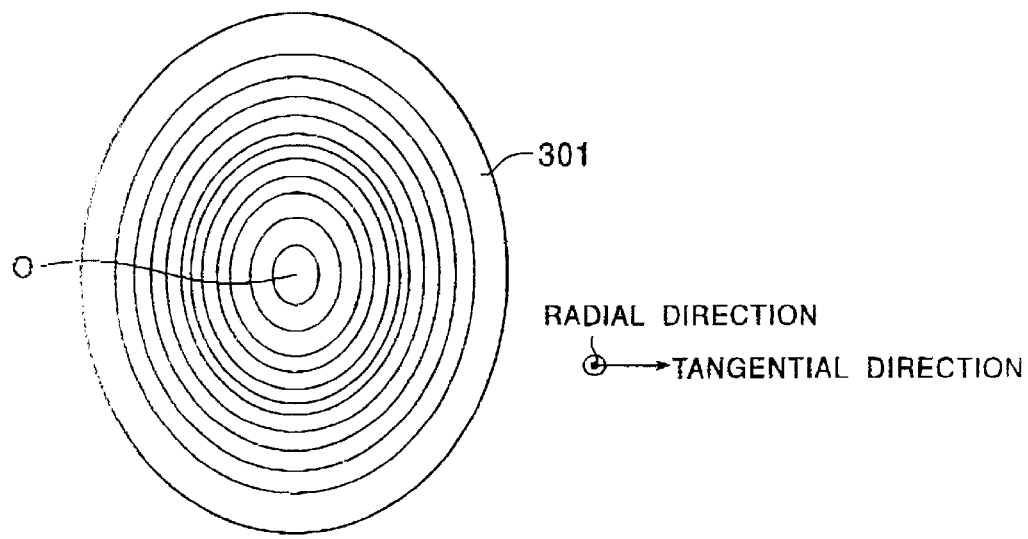
FIGS. 21 and 22 are schematic plan views of an aberration correcting device of the second embodiment.
Figure 22:
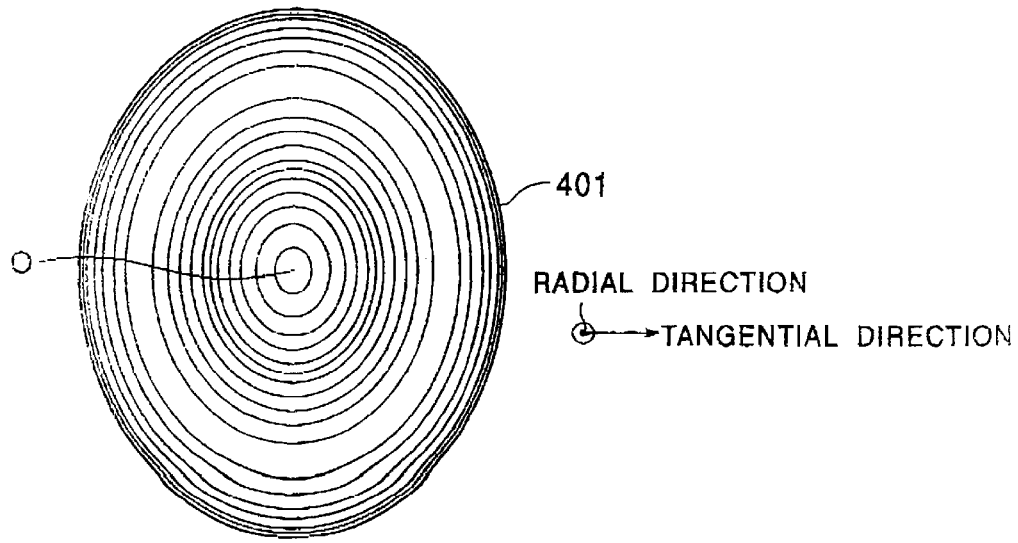

It is also possible to polish the compensators both in the radial direction and the tangential direction and simultaneously correct tilting in two directions by actuating one of the compensators along the x axis and the y axis. This modification facilitates machining and adjustment of parts, so that the compensators can be used as compensators 301 and 401 whose curved surfaces have symmetrical shapes with respect to the optical axis O as shown in contour line charts in FIGS. 21 and 22.

As the angle of inclination of the surfaces are small in the above-described embodiments, the adverse influence caused by the air gap formed between the first compensator and the second compensator is small. In a case where a larger comatic aberration should be corrected or high-precision correction is necessary, however, the shifting of the rays caused by the gap may be computed in advance so that the surface shape of the first compensator or the second compensator can be determined based on the computation result.

Although the surface shapes of the compensators are so determined as to accurately eliminate the produced aberration in the above-described embodiments, the surfaces of the compensators may be formed in step-like flat surfaces each having several steps by using an etching scheme. This can facilitate the preparation of aberration compensators This invention can be designed to have the function of a collimator lens or the like by making the surfaces of the first and second compensators on the side where they do not face each other have curvatures, not flat. Another structural modification is possible to design the non-facing surfaces as holograms so as to be able to generate servo signals or split the light beam. A further structural modification is possible to set one of the outward non-facing surfaces as a reflecting surface to give a phase difference to the light which hits and returns from the aberration compensator. The individual surfaces of the compensators can be designed in various shapes according to the wavefront shape to be compensated, and the same effects can be acquired as long as the length of the optical path of the light beam which has passed is changed asymmetrically by moving one of the compensators.

The above-described embodiments can be modified in various forms from the one employing an ordinary electromagnetic actuator using a winding coil to the one employing an actuator using a piezoelectric element.

Although the embodiments have been described as an optical pickup apparatus which is used in recording and reproducing signals on and from an optical disk, the present invention is not limited to the particular type, but may be adapted to other various optical apparatus which need correction of a comatic aberration, such as a microscope and an astronomical spectroscopy. In those cases, it is possible to employ a simple structure to manually adjust the aberration without automatically controlling the amount of movement of the aberration compensator.

According to the present invention with the above-described structures, the aberration caused by the tilt of the transparent disk substrate of an optical disk can be accurately and quickly corrected by slight movement of the compensator and the advancing direction of the light that passes the objective lens is not changed. In a system using an objective lens having a large numerical aperture, therefore, the transparent disk substrate of an optical disk which has a certain thickness can be used, so that the designed system has more freedom to cope with a stain, defect or the like of an optical disk. Furthermore, the present invention opens a way to accomplish high-density recording and reproduction of an optical card, optical disk and so forth using a flexible transparent substrate material.

Although, in the foregoing embodiments, the present invention is adapted to an optical disk comprising a transparent disk substrate through which the light beam is irradiated to the information recording layer thereof, the use of the present invention is not limited to the particular type optical disk. The present invention may be adapted to other disk types, for example, an optical disk comprising a disk substrate, an information recording layer and a transparent protective layer or plate (i.e., light-permeable layer) in which the recording and reproducing of information are preformed by passing a light beam through the transparent protective layer opposite to the disk substrate.

What is claimed is:

1. An aberration correcting device to be placed in an optical path extending from a light source of an optical pickup apparatus for irradiating an incident light beam onto an optical disk having a light-permeable layer, up to the optical disk, comprising:

a receiving light-transmission plate having a first surface receiving a light beam from said light source and a second surface emitting said light beam, and said second surface having an aspherical curved shape; and an emitting light-transmission plate having a first surface receiving a light beam from said receiving light-transmission plate and a second surface emitting said light beam, being positioned apart from said receiving light-transmission plate along an optical axis of said optical path, and said first surface having a complementary aspherical curved surface to said second surface of said receiving light-transmission plate;

wherein said aspherical curved surfaces have a shape to apply such a wavefront aberration that does not change the advancing direction of the light beam to said light beam passing through said aberration correcting device, and said receiving and emitting light-transmission plates are held freely movable relative to each other in a direction transverse to the optical path.

2. The aberration correcting device according to claim 1, wherein the complementary curved surfaces are symmetrical to each other at least in a radial direction or tangential direction of the optical disk.

3. An aberration correcting device to be placed in an optical path extending from a light source of an optical pickup apparatus for irradiating a light beam onto an optical disk having a light-permeable layer to the optical disk, comprising:

a pair of light-transmission substrates having complementary curved surfaces facing, and apart from, each other, at least one of the light-transmission substrates being held freely movable in such a way that a major surface thereof moves in a direction vertical to the optical path, the complementary curved surfaces being formed so as to make a relative movement of the light-transmission substrates vary an optical path length of a light beam transmitting the light-transmission substrates to impart a phase difference to the transmitting light beam, while allowing the phase difference to keep an advancing direction of the light beam thereby to minimize a comatic aberration imparted to the transmitting light beam by the light-permeable layer of the optical disk, wherein the complementary curved surfaces have shapes satisfying a following equation:

$$z=(ax)^4-(bx)^2$$

where z is a height in a direction parallel to the optical path and x is a radius about the optical path and $2a^2=b$.

4. The aberration correcting device according to claim 3, wherein one of the light-transmission substrates has a convex surface around the optical path and a normal line of the curved surface at an outermost portion within an effective radius is parallel to the optical path, and the other light-transmission substrate has a concave surface around the optical path and a normal line of the curved surface at the outermost portion within the effective radius is parallel to the optical path.

5. The aberration correcting device according to claim 3, wherein one of the light-transmission substrates has a convex surface around the optical path and a recess formed at an outer portion within an effective radius and a normal line of the curved surface at a bottom of the recess is parallel to the optical path, and the other light-transmission substrate has a concave surface around the optical path and a protrusion formed at an outer portion within the effective radius and a normal line of the curved surface at a top of the protrusion is parallel to the optical path.

6. The aberration correcting device according to claim 3, wherein one of the light-transmission substrates has a convex surface with a center being a symmetrical surface which is a plane including the optical path and a normal line of the curved surface at an outermost portion within an effective radius is parallel to the optical path, and the other light-transmission substrate has a concave surface with a center being the symmetrical surface and a normal line of the curved surface at the outermost portion within the effective radius is parallel to the optical path.

7. The aberration correcting device according to claim 3, wherein one of the light-transmission substrates has a convex surface with a center being a symmetrical surface which is a plane including the optical path and a recess formed at an outer portion within an effective radius and a normal line at a bottom of the recess is parallel to the optical path, and the other light-transmission substrate has a concave surface with a center being the symmetrical surface and a protrusion formed at an outer portion within the effective radius and a normal line at a base of the protrusion is parallel to the optical path.

8. The aberration correcting device according to claim 1, wherein at least one of the light-transmission plates is driven within a cylindrical surface with one point on the optical path being a center.

9. The aberration correcting device according to claim 1, wherein at least one of the light-transmission plates is driven within a spherical surface with one point on the optical path being a center.

10. An optical pickup apparatus for reading signals from and/or writing signals onto an optical disk having a light-permeable layer, comprising:

a light source for emitting a light beam;

an objective lens for focusing the light beam onto an information recording surface of the optical disk;

an optical irradiation system for guiding the light beam to the objective lens along an optical path;

an optical detection system, including photodetection means, for guiding reflected light from the information recording surface to the photodetection means;

tilt detection means for detecting a tilt of the optical disk at least in a radial direction or tangential direction thereof;

aberration correcting means located in the optical irradiation system and comprising:
  a receiving light-transmission plate having a first surface receiving a light beam from said light source and a second surface emitting said light beam, and said second surface having an aspherical curved shape; and
  an emitting light-transmission plate having a first surface receiving a light beam from said receiving light-transmission plate and a second surface emitting said light beam, being positioned apart from said receiving light-transmission plate along an optical axis of said optical path, and said first surface having a complementary aspherical curved surface to said second surface of said receiving light-transmission plate;
  wherein said aspherical curved surfaces have a shape to apply such a wavefront aberration that does not change the advancing direction of the light beam to said light beam passing through said aberration correcting means, and said receiving and emitting light-transmission plates are held freely movable relative to each other in a direction transverse to the optical path; and
  aberration correction driving means for moving the at least one of the light-transmission in a direction vertical to the optical path in accordance with an output of the tilt detection means corresponding to a tilt amount of the optical disk thereby to minimize a comatic aberration at least in a radial direction or tangential direction which is imparted to the transmitting light beam by the light-permeable layer of the optical disk.

11. The optical pickup apparatus according to claim 10, wherein at least one of the light-transmission plates is driven within a cylindrical surface with one point on the optical path being a center.

12. The optical pickup apparatus according to claim 10, wherein at least one of the light-transmission plates is driven within a spherical surface with one point on the optical path being a center.

* * * * *

UNITED STATES PATENT AND TRADEMARK OFFICE
CERTIFICATE OF CORRECTION

PATENT NO.    : 6,751,175 B1
DATED         : June 15, 2004
INVENTOR(S)   : Takanori Maeda et al.

It is certified that error appears in the above-identified patent and that said Letters Patent is hereby corrected as shown below:

<u>Column 18,</u>
Line 6, after "light-transmission" insert -- plates --.

Signed and Sealed this

Ninth Day of August, 2005

JON W. DUDAS
*Director of the United States Patent and Trademark Office*